United States Patent
Park et al.

(10) Patent No.: US 11,648,895 B2
(45) Date of Patent: May 16, 2023

(54) BOUNDED TIMING ANALYSIS OF INTRA-VEHICLE COMMUNICATION

(71) Applicant: GM Global Technology Operations LLC, Detroit, MI (US)

(72) Inventors: Taeju Park, Ann Arbor, MI (US); Soheil Samii, Royal Oak, MI (US); Prachi Joshi, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1175 days.

(21) Appl. No.: 16/233,281

(22) Filed: Dec. 27, 2018

(65) Prior Publication Data

US 2020/0207293 A1 Jul. 2, 2020

(51) Int. Cl.
*B60R 16/023* (2006.01)
*H04L 12/40* (2006.01)
(Continued)

(52) U.S. Cl.
CPC ...... *B60R 16/0231* (2013.01); *B60R 16/0238* (2013.01); *H04L 12/40156* (2013.01); *H04L 12/4625* (2013.01); *H04L 45/121* (2013.01); *H04L 67/12* (2013.01); *H04L 45/16* (2013.01); *H04L 2012/40273* (2013.01)

(58) Field of Classification Search
CPC ............ B60R 16/0231; B60R 16/0238; H04L 12/40156; H04L 12/4625; H04L 45/121; H04L 67/12; H04L 45/16; H04L 2012/40273; H04L 43/0852; H04L 12/413; H04L 1/0018; H04L 1/0033; H04L 1/0036; H04W 4/48
See application file for complete search history.

(56) References Cited

U.S. PATENT DOCUMENTS 10,577,120 B1 * 3/2020 Nelson .................. B64D 43/00
2005/0018611 A1 * 1/2005 Chan ...................... H04L 41/147
709/224

(Continued)

OTHER PUBLICATIONS

Grass et al., "Improved response-time bounds in fixed priority scheduling with arbitrary deadlines", Real-Time Syst. 2018, pp. 1-30.

*Primary Examiner* — Ajit Patel
*Assistant Examiner* — Wilfred Thomas
(74) *Attorney, Agent, or Firm* — Cantor Colburn LLP

(57) ABSTRACT

A vehicle and method for intra-vehicle communication within the vehicle involve a sending controller to transmit a message, and a receiving controller to receive the message. The vehicle includes one or more switches to relay the message from the sending controller to the receiving controller. The sending controller and each of the one or more switches include an egress port for transmission of the message. A processor performs bounded timing analysis to determine a total wait time during transmission of the message from the sending controller to the receiving controller as a sum of each egress port wait time at each egress port encountered by the message. Action is taken to avoid or mitigate the total wait time during transmission exceeding a deadline for the message, and the bounded timing analysis includes performing an iterative process and determining a lower bound (LB), an upper bound (UB), and a median value.

14 Claims, 4 Drawing Sheets

| $MSG_i$ | $T_i$ | $C_i$ | |
|---|---|---|---|
| M1 | 2 | 0.5 | 0, 2, 4 |
| M2 | 4 | 1 | 0, 4 |
| M3 | 5 | 1 | 0, 5 |
| M4 | 7 | 1 | 0 |

(51) Int. Cl.
  *H04L 12/46*    (2006.01)
  *H04L 45/121*   (2022.01)
  *H04L 67/12*    (2022.01)
  *H04L 45/16*    (2022.01)

(56) References Cited

U.S. PATENT DOCUMENTS

| | | | | |
|---|---|---|---|---|
| 2011/0316589 | A1* | 12/2011 | Kim | H03H 11/16 |
| | | | | 327/261 |
| 2015/0342539 | A1* | 12/2015 | Smits | A61B 5/4878 |
| | | | | 600/300 |
| 2015/0373158 | A1* | 12/2015 | Kim | H04L 12/40189 |
| | | | | 709/223 |
| 2017/0078946 | A1* | 3/2017 | Perry | H04L 45/22 |
| 2019/0370220 | A1* | 12/2019 | Tsutsumi | G06F 15/78 |
| 2020/0171893 | A1* | 6/2020 | Salt | G01M 5/0066 |
| 2021/0067926 | A1* | 3/2021 | Hwang | H04W 28/02 |
| 2021/0096516 | A1* | 4/2021 | Hayashi | H02M 7/5395 |

* cited by examiner

BOUNDED TIMING ANALYSIS OF INTRA-VEHICLE COMMUNICATION

INTRODUCTION

The subject disclosure relates to bounded timing analysis of intra-vehicle communication.

A vehicle (e.g., automobile, truck, construction equipment, farm equipment, automated factory equipment) typically includes multiple controllers referred to as electronic control units (ECUs). The ECUs may communicate with each other in a multi-hop network configuration in which a message from a transmitting ECU to a receiving ECU may involve using one or more intervening Ethernet switches to relay the message. As a result, the queuing delay experienced by a message at each egress port associated with the transmitting ECU and with each intervening switch may complicate timing analysis (i.e., the determination of total delay to communicate the message). Accordingly, it is desirable to provide bounded timing analysis of intra-vehicle communication.

SUMMARY

In one exemplary embodiment, a vehicle includes a sending controller to transmit a message, and a receiving controller configured to receive the message. The vehicle also includes one or more switches configured to relay the message from the sending controller to the receiving controller. The sending controller and each of the one or more switches include an egress port for transmission of the message. A processor performs bounded timing analysis to determine a total wait time during transmission of the message from the sending controller to the receiving controller as a sum of each egress port wait time at each of the egress ports encountered by the message. Action is taken to avoid or mitigate the total wait time during transmission exceeding a deadline for the message, and the bounded timing analysis includes performing an iterative process and determining a lower bound (LB), an upper bound (UB), and a median value.

In addition to one or more of the features described herein, the processor is part of the sending controller, the receiving controller, or a third controller.

In addition to one or more of the features described herein, the processor determines an initial value for the lower bound (LB) and for the upper bound (UB).

In addition to one or more of the features described herein, the processor is configured to compute the median value at each iteration of the iterative process as:

$$\text{median} = \frac{(LB + UB)}{2}.$$

In addition to one or more of the features described herein, the processor computes an initial value for the egress port wait time $w_{i,j}$ at a given jth one of the egress ports at each iteration of the iterative process as:

$$w_{i,j} = \alpha + \Sigma \left\lceil \frac{\text{median}}{T_i} \right\rceil C_i,$$

where i is an index for the message, $T_i$ is a period of the message, and $C_i$ is a transmission time for each transmission of the message.

In addition to one or more of the features described herein, the egress port wait time $w_{i,j}$ of the message is determined to be the median value based on the median value computed for the iteration being equal to the initial value for the egress port wait time $w_{i,j}$ computed for the iteration.

In addition to one or more of the features described herein, the initial value for the lower bound (LB) or for the upper bound (UB) is adjusted prior to a next iteration of the iterative process based on the median value computed for the iteration not being equal to the initial value for the egress port wait time $w_{i,j}$ computed for the iteration.

In addition to one or more of the features described herein, the action to avoid the total wait time during transmission exceeding the deadline for the message includes discarding another message that precedes the message in a queue at one of the one or more switches to relay the message.

In addition to one or more of the features described herein, the action to mitigate the total wait time during transmission exceeding the deadline for the message includes reducing a service level of a service of the vehicle provided by communication of the message.

In addition to one or more of the features described herein, the receiving controller controls an operation of the vehicle based on the message.

In another exemplary embodiment, a method for intra-vehicle communication in a vehicle includes transmitting a message from a sending controller of the vehicle for receipt by a receiving controller, and relaying the message between the sending controller and the receiving controller using one or more switches. The sending controller and each of the one or more switches include an egress port for transmission of the message. The method also includes performing bounded timing analysis to determine a total wait time during transmission of the message from the sending controller to the receiving controller as a sum of each egress port wait time at each of the egress ports encountered by the message. The performing the bounded timing analysis includes performing an iterative process and determining a lower bound (LB), an upper bound (UB), and a median value. Action is taken to avoid or mitigate the total wait time during transmission exceeding a deadline for the message.

In addition to one or more of the features described herein, the performing the bounded timing analysis is by the sending controller, the receiving controller, or a third controller.

In addition to one or more of the features described herein, the method also includes determining an initial value for the lower bound (LB) and for the upper bound (UB).

In addition to one or more of the features described herein, the method also includes computing the median value at each iteration of the iterative process as:

$$\text{median} = \frac{(LB + UB)}{2}.$$

In addition to one or more of the features described herein, the method also includes computing an initial value for the egress port wait time $w_{i,j}$ at a given jth one of the egress ports at each iteration of the iterative process as:

$$w_{i,j} = \alpha + \Sigma \left\lceil \frac{\text{median}}{T_i} \right\rceil C_i,$$

where
i is an index for the message, $T_i$ is a period of the message, and $C_i$ is a transmission time for each transmission of the message.

In addition to one or more of the features described herein, the method also includes determining the egress port wait time $w_{i,j}$ of the message to be the median value based on the median value computed for the iteration being equal to the initial value for the egress port wait time $w_{i,j}$ computed for the iteration.

In addition to one or more of the features described herein, the method also includes adjusting the initial value for the lower bound (LB) or for the upper bound (UB) prior to a next iteration of the iterative process based on the median value computed for the iteration not being equal to the initial value for the egress port wait time $w_{i,j}$ computed for the iteration.

In addition to one or more of the features described herein, the taking the action to avoid the total wait time during transmission exceeding the deadline for the message includes discarding another message that precedes the message in a queue at one of the one or more switches configured to relay the message.

In addition to one or more of the features described herein, the taking the action to mitigate the total wait time during transmission exceeding the deadline for the message includes reducing a service level of a service of the vehicle provided by communication of the message.

In addition to one or more of the features described herein, the method also includes the receiving controller controlling an operation of the vehicle based on the message.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
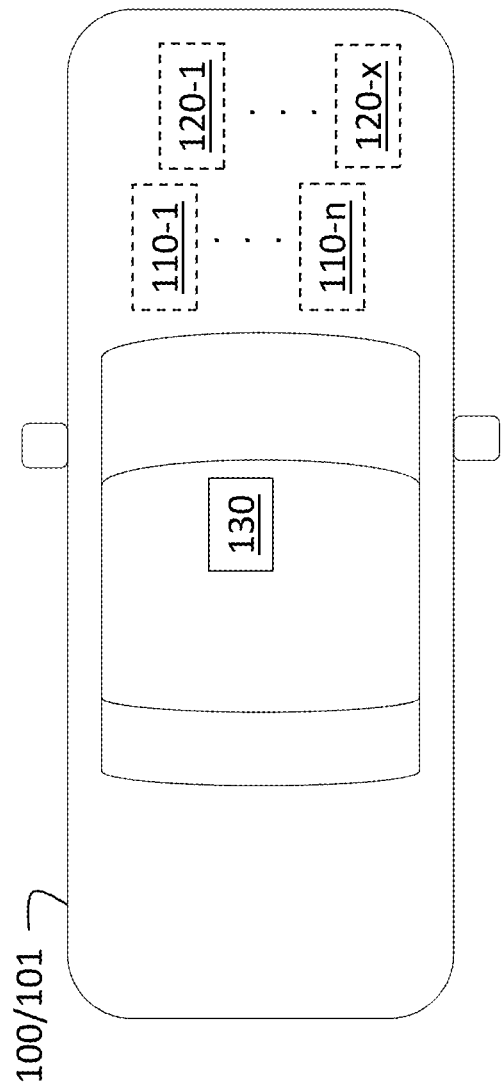
FIG. 1 is a block diagram of a vehicle including systems to perform bounded timing analysis of intra-vehicle communication according to one or more embodiments.

The following description is merely exemplary in nature and is not intended to limit the present disclosure, its application or uses. It should be understood that throughout the drawings, corresponding reference numerals indicate like or corresponding parts and features.

As previously noted, a vehicle may include multiple ECUs that communicate with each other. The ECUs may be used for autonomous operation of the vehicle or for augmented vehicle systems (e.g., collision avoidance, adaptive cruise control, automatic braking), for example. In order to control one or more vehicle operations, two or more ECUs may communicate with each other. As also noted previously, communication among ECUs of a vehicle may be via a multi-hop network that involves using Ethernet switches to relay a message. The total time to deliver a message must, therefore, consider the queuing delay associated with the transmitting ECU and each Ethernet switch between the sending and receiving ECUs.

Many messages exchanged by ECUs may have deadlines such that determination of end-to-end latency (i.e., totally time for the message to travel between the sending ECU and receiving ECU) is an important aspect of determining if the deadline will be met. If a deadline is not or will not be met, the sending ECU or a different controller may take one of several actions. The action may depend on the type of vehicle operation (e.g., infotainment system, safety system) to which the message pertains. One exemplary action is to notify an operator (e.g. driver) that the service associated with the message has been degraded or is unavailable. This action may be appropriate for messages associated with the infotainment or other non-critical system. Another exemplary action is to discard other messages to decrease the latency associated with delivery of the particular message. This action may be appropriate for a relatively high priority message. Prior approaches to determining the end-to-end latency (i.e., to performing timing analysis) involve the use of a recursive equation. Thus, bounding the execution time to perform timing analysis is difficult. Embodiments of the systems and methods detailed herein relate to bounded timing analysis of intra-vehicle communication. A pseudo binary-search based timing analysis technique is used as further detailed.

In accordance with an exemplary embodiment, FIG. 1 is a block diagram of a vehicle 100 including systems to perform bounded timing analysis of intra-vehicle communication. The vehicle 100 shown in FIG. 1 is an automobile 101. The exemplary vehicle 100 includes a set of ECUs 110-1 through 110-n (generally referred to as 110) and Ethernet switches 120-1 through 120-x (generally referred to as 120). The vehicle 100 may also include one or more sensors 130 (e.g., a radar system, a lidar system, and a camera). One or more ECUs 110 may process data from the sensors 130. In addition, the ECUs 110 may perform autonomous driving or control various aspects of the operation of the vehicle 100 (e.g., braking, steering). While exemplary locations are indicated in FIG. 1 for the ECUs 110, Ethernet switches 120, and sensors 130, the location and relative arrangement of any of the components may be different according to alternate embodiments. The ECUs 110 may include processing circuitry and other components. The processing circuitry of the ECUs 110 may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
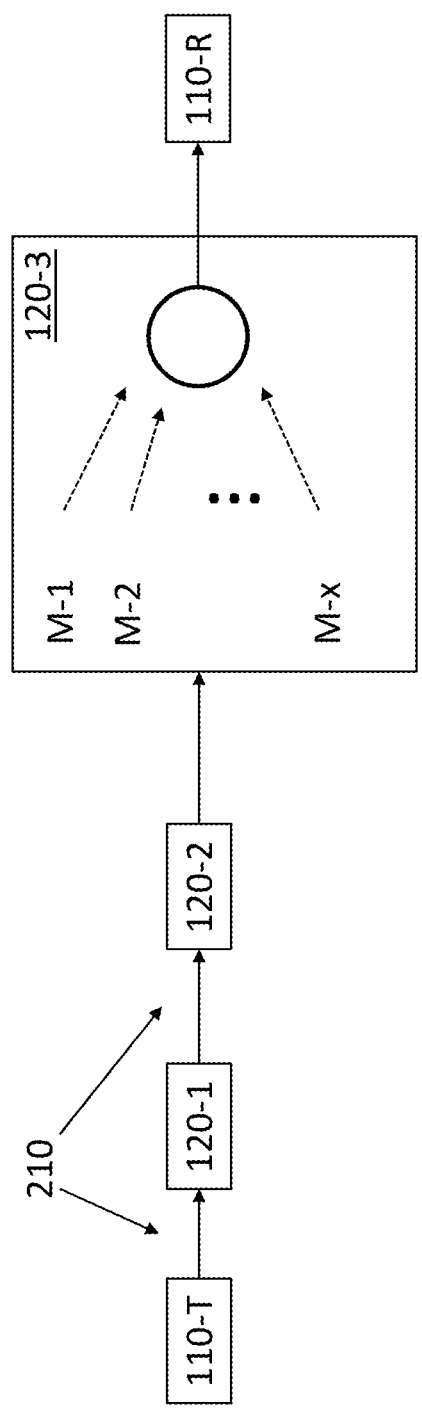
FIG. 2 illustrates exemplary intra-vehicle communication for which bounded timing analysis is performed according to one or more embodiments.

FIG. 2 illustrates exemplary intra-vehicle communication for which bounded timing analysis is performed according to one or more embodiments. The transmitting ECU 110-T and the receiving ECU 110-R are shown with three intervening Ethernet switches 120-1, 120-2, and 120-3. The ECUs 110 and Ethernet switches 120 may share a bus 210 for communication rather than being interconnected as shown for explanatory purposes. The message queue within the Ethernet switch 120-3 is indicated. The messages M-1 through M-x are arranged by priority such that M-1 is the highest priority message at the egress port of Ethernet switch 120-3, and M-x is the lowest priority message in the queue of messages. The path from ECU 110-T→120-1→120-2→120-3→110-R is one exemplary path for an exemplary message (e.g., M-2), but other messages may take different paths. For example, messages shown in the queue at Ethernet switch 120-3 may take different paths such that M-1, for example, may be sent to a different Ethernet switch 120 or ECU 110 rather than to ECU 110-R.

The total wait time for a message (e.g., M-2) between ECU 110-T and ECU 110-R may be designated as $w^k$. The total wait time $w^k$ for a given ith message is a sum of the egress port wait time $w_{i,j}$ at each of the j egress ports that the message encounters (i.e., the wait time at ECU 110-T and at each Ethernet switch 120 between ECU 110-T and ECU 110-R). In the exemplary case shown in FIG. 2, the total wait time $w^k$ must consider the queuing delay (i.e., egress port wait time $w_{i,j}$) at the egress port of ECU 110-T through the queuing delay at the egress port of Ethernet switch 120-3. That is, each queuing delay may be expressed as $w_{i,j}$ with i being the index for a given message and j being the index for a given egress port. As previously noted, a recursive computation was previously used to determine the total wait time $w^k$. As detailed with reference to FIG. 3, the process of determining the total wait time $w^k$ is bounded according to one or more embodiments. Specifically, an upper bound (UB) and lower bound (LB) are used to converge on the total wait time $w^k$.

Figure 3:
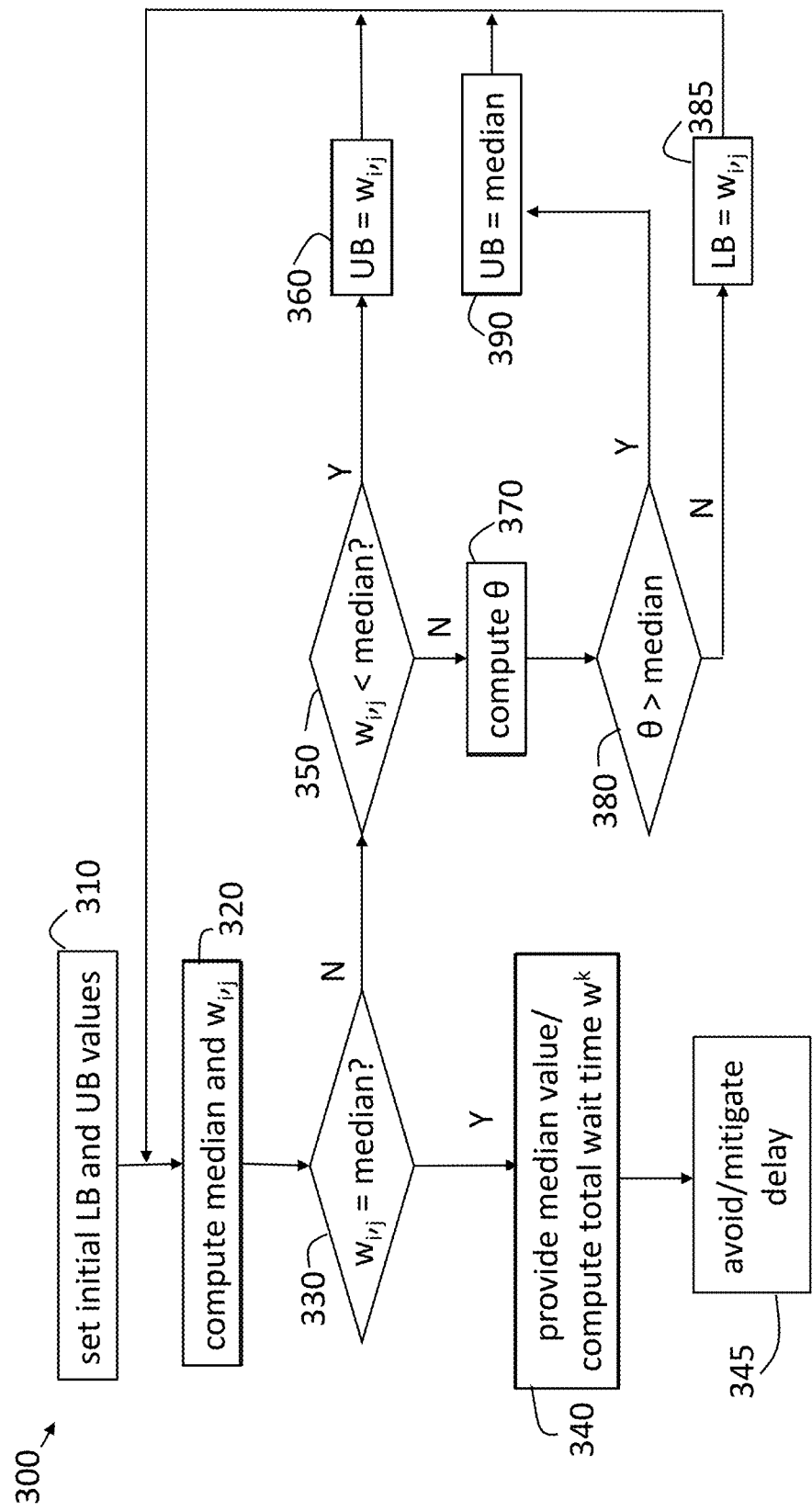
FIG. 3 is a process flow of a method of performing bounded timing analysis of intra-vehicle communication according to one or more embodiments.

FIG. 3 is a process flow 300 of a method of performing bounded timing analysis of intra-vehicle communication according to one or more embodiments. The process flow 300 may be performed at an ECU 110 that is sending a message or at a central ECU 110 that may not be involved in the communication itself but determines the latency for intra-vehicle communication. More than one ECU 110 may perform the processes, as well, according to an alternate embodiment. As detailed, the processes at every block, except part of the process at block 340 and the process at block 345, are performed for each port (i.e., each index j) traversed by the message (i.e., index i) for which total wait time $w^k$ is being computed. At block 310, setting initial values for LB and UB includes setting the initial value of LB as the known time that it takes to clear the bus 210 and reset between messages. The initial value of the upper bound UB for the particular message (index i) and egress port 120 (index j) may be obtained (at block 310) using an existing upper bound analysis technique from the following equations:

$$UB_{i,j} = \frac{C_{i+1} + b_{1\ldots i}}{1 - U_{1\ldots i}} \quad [\text{EQ. 1}]$$

$$b_{1\ldots i} = \sum_{k=1}^{i} C_k \left(1 - \frac{U_k}{1 - U_{1\ldots k-1}}\right) \quad [\text{EQ. 2}]$$

$$U = \frac{c_i}{\text{bus bandwidth}} \quad [\text{EQ. 3}]$$

$$U_{1\ldots K} = \sum_{k=1}^{i} U_k \quad [\text{EQ. 4}]$$

In the equations, $C_i$ is the transmission time for the ith message at the jth egress port 120. The priority of messages with index k<i is more than the priority of message i. The bus bandwidth in EQ. 3 is the bandwidth of the bus 210.

At block 320, computing a median value and the egress port wait time $w_{i,j}$ includes implementing the following formulas:

$$\text{median} = \frac{(LB + UB)}{2} \quad [\text{EQ. 5}]$$

$$w_{i,j} = \alpha + \Sigma \left\lceil \frac{\text{median}}{T_i} \right\rceil C_i \quad [\text{EQ. 6}]$$

In EQ. 6, i is an index for the message, $T_i$ is the period of the message (i.e., how often the message must be repeated). At block 330, a check is done of whether the egress port wait time $w_{i,j}$ (at EQ. 6) is computed to be the same as the median (at EQ. 5). If it is, then the processes include providing the median value as the egress port wait time $w_{i,j}$, at block 340.

If the check at block 330 determines that the computed egress port wait time $w_{i,j}$ is not the same as the computed median, then another check is done, at block 350, of whether the egress port wait time $w_{i,j}$ is less than the median. If the computed egress port wait time $w_{i,j}$ is less than the median (at block 350), then the upper bound (UB) is set to the value of the egress port wait time $w_{i,j}$, at block 360, and another iteration is performed starting with computing the median and the egress port wait time $w_{i,j}$, at block 320. If the computed egress port wait time $w_{i,j}$ is not less than the median (at block 350), then the latest completion time θ of messages that are released before the median is computed at block 370. The latest completion time θ is further discussed with reference to FIG. 4. At block 380, a check is done of whether the latest completion time θ is more than the median value (computed at block 320). If the latest completion time θ is more than the median, then the upper bound (UB) is set to the median, at block 390, and another iteration is performed starting with computing the median and the egress port wait time $w_{i,j}$, at block 320. If the latest completion time θ is not more than the median, then the lower bound (LB) is set to the egress port wait time $w_{i,j}$, at block 385, and another iteration is performed starting with computing the median and the egress port wait time $w_{i,j}$, at block 320.

Once the egress port wait time $w_{i,j}$ is obtained (at block 340) for all of the egress ports (i.e., transmitting ECU 110 and intervening Ethernet switches 120) between the communicating ECUs 110, a sum of the egress port wait time $w_{i,j}$ for every egress port (i.e., every j) is computed (at block 340) to obtain the total wait time $w^k$ for the message (i.e., for the relevant i). At block 345, avoiding or mitigating a delay refers to actions that may be taken if the total wait time $w^k$ fails to conform with the deadline for the given message. As previously noted, a message may be associated with a deadline such that the total wait time $w^k$ facilitates a determination of whether the message will reach the recipient ECU 110 within the deadline. The deadline for a given message may be based on its priority, for example. As also previously noted, an indication that the total wait time $w^k$ fails to meet the deadline may result in a notification or other action. Avoiding a delay, at block 345, includes modifying the message queue (e.g., discarding one or more other messages) to ensure that the deadline is met. Mitigating the delay, at block 345, reducing the level of a service provided through the message. If the message reaches the recipient ECU 110 within the deadline, as determined by the processes shown in FIG. 3, the message may be used to control an aspect of the operation of the vehicle (e.g., collision avoidance, automatic braking, infotainment) or the autonomous operation of the vehicle.

Figure 4:
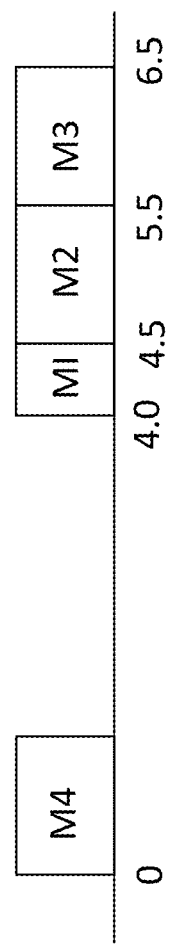
FIG. 4 shows an exemplary traffic flow for discussion of aspects of the bounded timing analysis of intra-vehicle communication according to one or more embodiments.

FIG. 4 shows an exemplary traffic flow at an exemplary egress port for discussion of aspects of the bounded timing analysis of intra-vehicle communication according to one or more embodiments. Specifically, the determination of the latest completion time θ is explained with the exemplary messages M1, M2, M3, and M4 shown in FIG. 4. The table in FIG. 4 indicates the period Ti of each of the messages and the transmission time Ci of each of the messages. The exemplary median is 5.1. The time values (Ti, Ci, median) may be in any time units such as, for example, milliseconds (ms). The last column of the table indicates the time of transmission of each of the messages if no other messages existed (i.e., if there were no queue to consider). Only times of transmission prior to the median value of 5.1 are shown. Thus, for example, 7 is not shown in addition to 0 for message M4, which has a period of 7. Instead, only 0 is shown, because it precedes the median of 5.1.

From this information, the timeline shown at the bottom of FIG. 4 may be derived. Essentially, the last (i.e., bolded) of the transmission times listed in the last column is the time of interest for each message, but message M2 may not be transmitted at time 4 because of the interference with the transmission of message M1 and message M3 may not be transmitted at time 5 because of the interference with the transmission of message M2. Instead, message M2 is transmitted after the transmission time of message M1, and message M3 is transmitted after the transmission time of message M2. As shown in FIG. 4, all of the messages are transmitted by 6.5. This is the value of the latest completion time θ for the exemplary case.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle, comprising:
    a sending controller configured to transmit a message;
    a receiving controller configured to receive the message;
    one or more switches configured to relay the message from the sending controller to the receiving controller, wherein the sending controller and each of the one or more switches include an egress port for transmission of the message; and
    a processor configured to perform bounded timing analysis to determine a total wait time during transmission of the message from the sending controller to the receiving controller as a sum of each egress port wait time at each of the egress ports of the sending controller and the one or more switches encountered by the message, wherein action is taken to avoid or mitigate the total wait time during transmission exceeding a deadline for the message, and the bounded timing analysis includes performing an iterative process and determining a lower bound (LB), an upper bound (UB), and a median value of the LB and the UB, wherein the LB and the UB are time values used to converge on the total wait time during transmission of the message from the sending controller to the receiving controller,
    wherein the processor is configured to determine an initial value for the LB and for the UB, compute the median value at each iteration of the iterative process as:

$$\text{median} = \frac{(LB + UB)}{2}$$

and compute an initial value for the egress port wait time $w_{i,j}$ at a given jth one of the egress ports at each iteration of the iterative process as:

$$w_{i,j} = \alpha + \Sigma \left\lceil \frac{\text{median}}{T_i} \right\rceil C_i,$$

where
    i is an index for the message, $T_i$ is a period of the message, $C_i$ is a transmission time for each transmission of the message, and α is a constant.

2. The vehicle according to claim 1, wherein the processor is part of the sending controller, the receiving controller, or a third controller.

3. The vehicle according to claim 1, wherein the egress port wait time $w_{i,j}$ of the message is determined to be the median value based on the median value computed for the iteration being equal to the initial value for the egress port wait time $w_{i,j}$ computed for the iteration.

4. The vehicle according to claim 3, wherein the initial value for the lower bound (LB) or for the upper bound (UB) is adjusted prior to a next iteration of the iterative process based on the median value computed for the iteration not being equal to the initial value for the egress port wait time $w_{i,j}$ computed for the iteration.

5. The vehicle according to claim 1, wherein the action to avoid the total wait time during transmission exceeding the deadline for the message includes discarding another message that precedes the message in a queue at one of the one or more switches configured to relay the message.

6. The vehicle according to claim 1, wherein the action to mitigate the total wait time during transmission exceeding the deadline for the message includes reducing a service level of a service of the vehicle provided by communication of the message.

7. The vehicle according to claim 1, wherein the receiving controller controls an operation of the vehicle based on the message.

8. A method for intra-vehicle communication in a vehicle, the method comprising:
    transmitting a message from a sending controller of the vehicle for receipt by a receiving controller;
    relaying the message between the sending controller and the receiving controller using one or more switches, wherein the sending controller and each of the one or more switches include an egress port for transmission of the message;
    performing bounded timing analysis to determine a total wait time during transmission of the message from the sending controller to the receiving controller as a sum of each egress port wait time at each of the egress ports of the sending controller and the one or more switches encountered by the message, wherein the performing the bounded timing analysis includes performing an iterative process and determining a lower bound (LB), an upper bound (UB), and a median value of the LB and the UB, and the LB and the UB are time values used to converge on the total wait time during transmission of the message;

determining an initial value for the LB and for the UB;

computing the median value at each iteration of the iterative process as:

$$\text{median} = \frac{(LB + UB)}{2};$$

computing an initial value for the egress port wait time $w_{i,j}$ at a given jth one of the egress ports at each iteration of the iterative process as:

$$w_{i,j} = \alpha + \Sigma \left\lceil \frac{\text{median}}{T_i} \right\rceil C_i,$$

where i is an index for the message, $T_i$ is a period of the message, $C_i$ is a transmission time for each transmission of the message, and $\alpha$ is a constant; and taking action to avoid or mitigate the total wait time during transmission exceeding a deadline for the message.

9. The method according to claim 8, wherein the performing the bounded timing analysis is by the sending controller, the receiving controller, or a third controller.

10. The method according to claim 8, further comprising determining the egress port wait time $w_{i,j}$ of the message to be the median value based on the median value computed for the iteration being equal to the initial value for the egress port wait time $w_{i,j}$ computed for the iteration.

11. The method according to claim 10, further comprising adjusting the initial value for the lower bound (LB) or for the upper bound (UB) prior to a next iteration of the iterative process based on the median value computed for the iteration not being equal to the initial value for the egress port wait time $w_{i,j}$ computed for the iteration.

12. The method according to claim 8, wherein the taking the action to avoid the total wait time during transmission exceeding the deadline for the message includes discarding another message that precedes the message in a queue at one of the one or more switches configured to relay the message.

13. The method according to claim 8, wherein the taking the action to mitigate the total wait time during transmission exceeding the deadline for the message includes reducing a service level of a service of the vehicle provided by communication of the message.

14. The method according to claim 8, further comprising the receiving controller controlling an operation of the vehicle based on the message.

* * * * *